United States Patent [19]

Barritt

[11] 4,128,945
[45] Dec. 12, 1978

[54] EASILY ATTACHABLE AND DETACHABLE GAUGE FOR RE-LOCATING TESTED BEVEL GEARS ON A GEAR-CUTTING MACHINE

[76] Inventor: Murrell R. Barritt, 2208 Keokuk Dr., Springfield, Ill. 62702

[21] Appl. No.: 777,654

[22] Filed: Mar. 15, 1977

[51] Int. Cl.² ............................ G01B 5/00; B23C 3/04
[52] U.S. Cl. ................................ 33/181 R; 33/185 R; 33/DIG. 1; 90/11 E; 90/DIG. 24
[58] Field of Search ........... 33/174 J, 179.5 R, 180 R, 33/181 R, 185 R, DIG. 1; 335/295; 90/11 E, DIG. 24

[56] References Cited

U.S. PATENT DOCUMENTS

| | | | |
|---|---|---|---|
| 2,095,059 | 10/1937 | Donnelly, Jr. | 33/174 J |
| 2,280,437 | 4/1942 | Levesque | 335/295 |
| 2,345,298 | 3/1944 | Semar | 33/180 R |
| 2,417,234 | 3/1947 | Calow | 33/DIG. 1 |
| 2,659,972 | 11/1953 | Norris | 33/DIG. 1 |
| 2,888,617 | 5/1959 | Baumet | 335/295 |
| 3,367,612 | 2/1968 | Usiskin | 33/172 R |

*Primary Examiner*—Richard R. Stearns
*Attorney, Agent, or Firm*—Ralph F. Staubly

[57] ABSTRACT

A neutralizable permanent-magnet base is shaped to engage the usual housing for the gear-supporting mandrel of known types of gear cutters. A U-shaped yoke fixed to the top of the base supports a pivot block on a transverse horizontal axis. The pivot block receives a sliding cylindrical arm for rotational and length adjustments. A probe head on the front end of the sliding arm carries a ball or other-shaped probe which can be swung downwardly between gear teeth before removal, then upwardly to permit gear removal for testing, again downwardly to accurately re-locate the gear if found defective but salvageable, and finally upwardly for the re-cutting of one, several or all of the teeth of the defective gear.

4 Claims, 5 Drawing Figures

U.S. Patent  Dec. 12, 1978  4,128,945
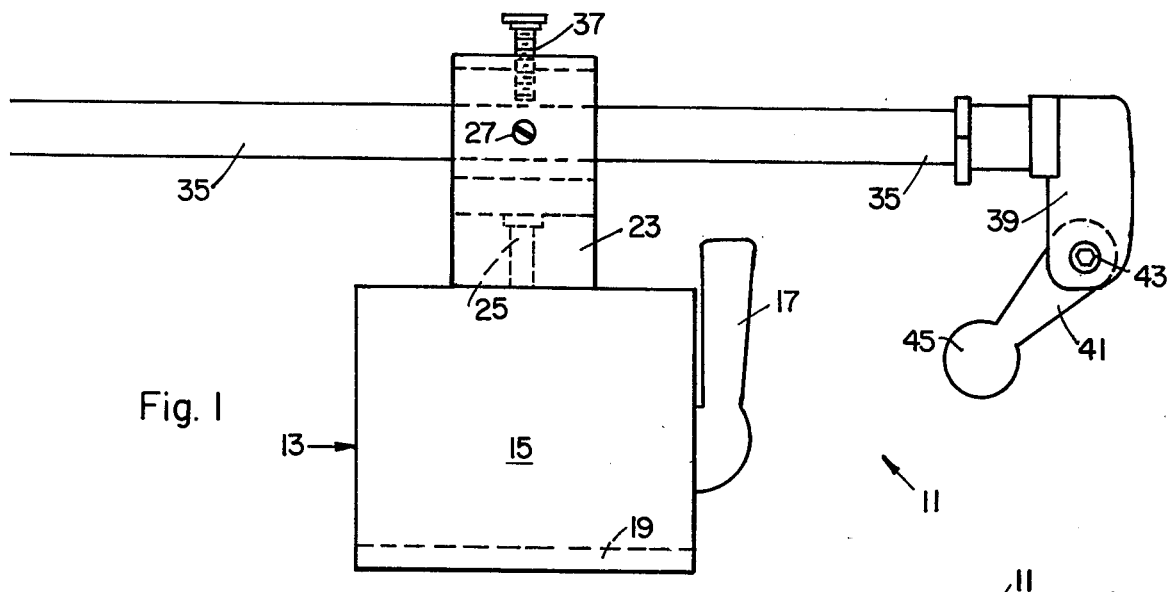
Fig. 1
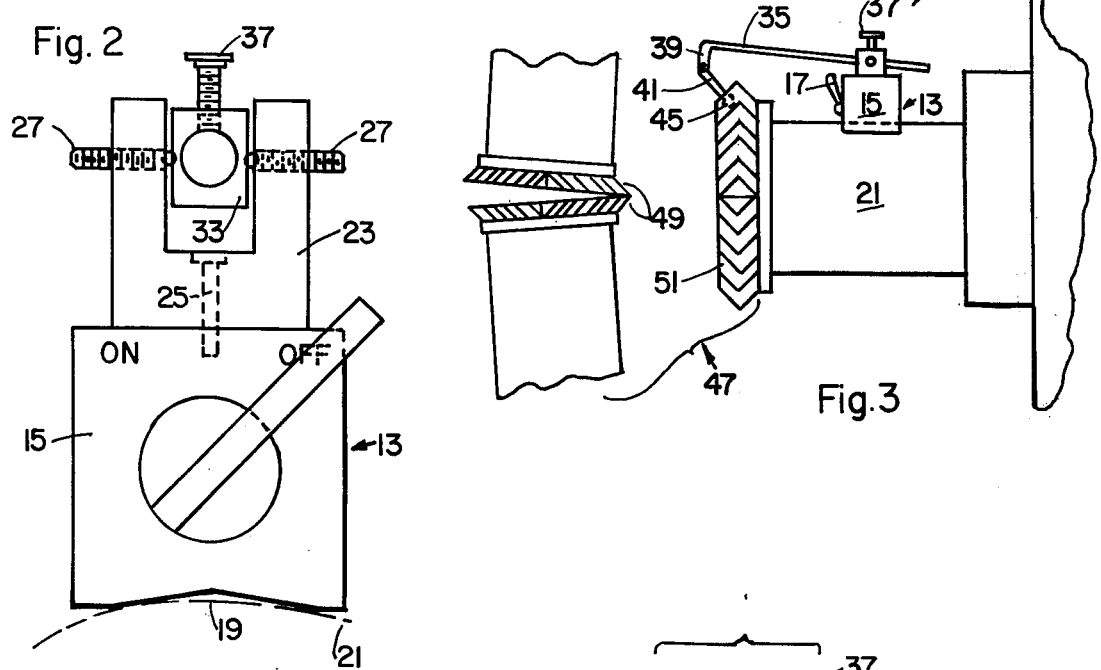
Fig. 2
Fig. 3
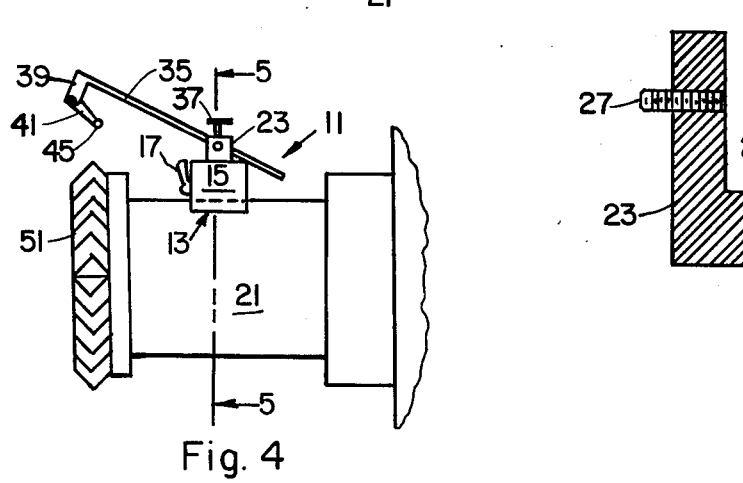
Fig. 4
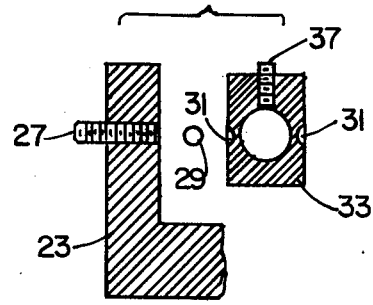
Fig. 5

EASILY ATTACHABLE AND DETACHABLE GAUGE FOR RE-LOCATING TESTED BEVEL GEARS ON A GEAR-CUTTING MACHINE

BACKGROUND AND OBJECTS OF THE INVENTION

Heretofore, bevel gears that when tested have been found to have been inaccurately cut, then have been discarded at great economic loss in time and materials. On presently available gear-cutting machines it has been found that bevel gears cannot be accurately re-located on the machines for re-cutting. It has been found that well over half of such gears could be salvaged if accurate relocating for recutting were made possible. It is accordingly the object of this invention to provide a portable gauge that can be easily and quickly firmly attached to conventional gear cutters for gauging the position of a bevel gear before its removal for testing and then can be used to re-locate the gear on the machine for correcting the salvageable gears by remachining one, several or all teeth on one or both surfaces thereof. Other objects and advantages will become apparent as the following detailed description proceeds.

BRIEF DESCRIPTION OF THE DRAWINGS

FIG. 1 is a side elevational view of a preferred embodiment of the invention.

FIG. 2 is an end elevational view of the disclosure of FIG. 1 with the arm and probe removed for clarity.

FIG. 3 is a side elevational view of the gauge attached to a fragmentary showing of a known type of gear-cutting machine and positioned to gauge the position of a cut gear before its removal for testing.

FIG. 4 is a view similar to FIG. 3 but showing the gauge arm and probe swung upwardly to permit removal for testing, and later replacement for re-cutting if needed, of the gear just cut.

FIG. 5 is an enlarged exploded fragmentary end view of the upper left fourth of FIG. 2 in section on the line 5—5 of FIG. 4.

With reference now to the drawings, the numeral 11 generally designates the gauge as a unit. The gauge 11 comprises a base member 13 which is herein disclosed as a strong permanent block magnet 15 of known-construction ("Craftsman"No. 9-38908 D.J., sold at retail by Sears, Roebuck and Co., Chicago, Illinois). The block magnet 15 is of the neutralizable type controlled by an ON-OFF arm 17, and has a shallow V-shaped trough 19 for parallel-line firm holding against a cylindrical ferromagnetic surface 21 (FIG. 2).

A U-shaped yoke block 23 is permanently fixed to the top surface of the base member 13 as by a bolt 25 (FIG. 1). The yoke block 23 is transversely bored and tapped to receive a pair of threaded bearing rods 27, the ends of which are spherically dished, each to receive one of a pair of bearing balls 29 (FIGS. 2 and 5). Each of the bearing balls 29 fits in one of a pair of spherical bearing depressions 31 on opposite sides of a pivot block 33.

The pivot block 33 is longitudinally bored to receive a sliding cylindrical rod 35, which rod is clampable in its axially and rotationally adjustable positions by a screw 37. On one end of the rod 35 there is fixed in any suitable manner a radially extending bifurcated member 39 between the webs of which is located a short probe-carrying arm 41. The arm 41 is clampable by a threaded bolt 43 in any of its adjustable positions about said bolt 43 as an axis. The swingable end of the arm 41 has fixed thereto a probe ball 45 insertable between and in contact with adjacent teeth of a gear just cut, or being re-located for salvage re-cutting after testing. The probe ball could take other shapes (e.g. cylindrical, not shown) and could be made somewhat adjustable and/or replaceable on the end of the arm 41, if preferred.

FIGS. 3 and 4 illustrate the use of the gauge 11 with a known type of gear-cutting machine generally designated 47. The machine 47 has a pair of rotatable cutters 49 and a cylindrical housing 21 (FIGS. 2 and 3) for a mandrel (not shown) for holding a gear during cutting in known manner. In FIG. 3 the cutters 49 and the gear 51 are shown separated so that the gauge 11 can be positioned either just after the gear has been cut or while the gear is being re-positioned for salvage re-cutting. In FIG. 4, the gauge is shown in the position which permits removal, re-placement or cutting or re-cutting.

It should be noted that the gauge herein disclosed not only can be used to re-cut one, several or all of the teeth of a gear, but also could be employed to re-cut only one surface of each tooth by the simple expedient of firmly positioning a common dial gauge beside the probe in its gauging position (with the gear absent) and then gently tapping the base member 13 to move it and thus the probe a few thousandths to the left or right as desired.

The invention having thus been described, what is claimed as being new and patentable is:

1. A gauge for re-locating imperfectly cut but salvageable bevel gears removed for testing from a gear-cutting machine having a horizontally disposed rotatable gear-supporting mandrel upwardly covered by a co-axial cylindrically curved ferromagnetic sheet, said gauge comprising: a base member partly of magnetic material having an elongated shallow channel, of inverted V-shape in cross-section, in its bottom surface for magnetically firmly attaching said base member to said ferromagnetic sheet; a pair of spaced upright members fixed to the top of said base member; a cylindrically bored body positioned between said upright members; means pivotally and frictionally holding said bored body in positions rotated about a horizontally disposed axis transverse to the bore of said bored body; a cylindrical arm rotatably and axially adjustably received in the bore of said bored body; a probe member connected to an end of said arm and extending downwardly therefrom and having a rounded-body tip for insertion between adjacent teeth of a gear mounted on said mandrel.

2. Structure according to claim 1, said magnetic material being permanently magnetized.

3. Structure according to claim 2 and additionally comprising magnetic-field-neutralizing means.

4. Structure according to claim 1, said probe member being medially divided and connected by means permitting its parts to be swung between frictionally held adjusted positions.

* * * * *